Aug. 5, 1952     L. R. BUCKENDALE     2,605,749
POWER-OPERATED MULTISTAGE SPEED SELECTOR MECHANISM
Filed May 16, 1945     4 Sheets-Sheet 1

Inventor
Lawrence R. Buckendale
Strauch & Hoffman
Attorneys

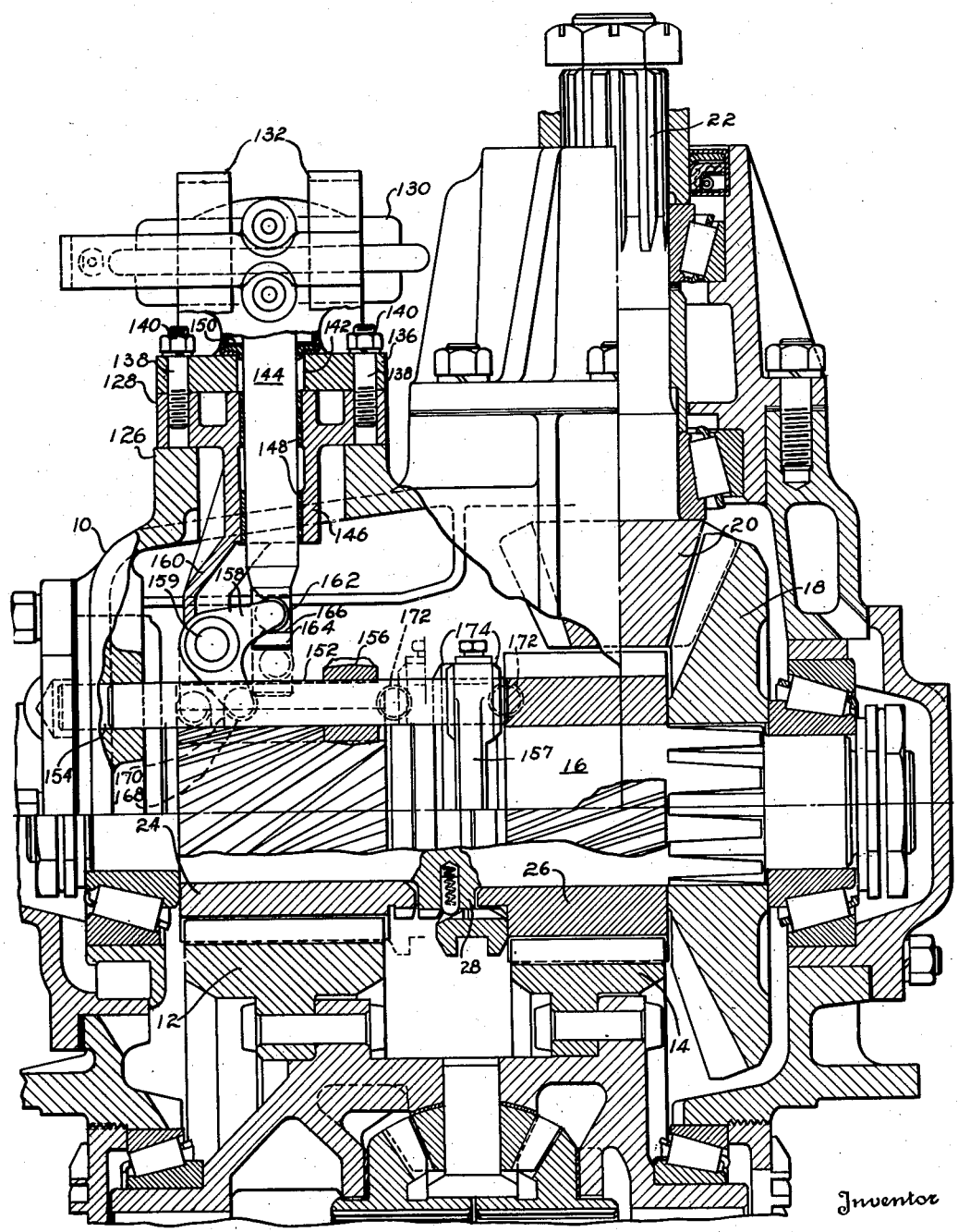

Aug. 5, 1952     L. R. BUCKENDALE     2,605,749
POWER-OPERATED MULTISTAGE SPEED SELECTOR MECHANISM
Filed May 16, 1945     4 Sheets—Sheet 4
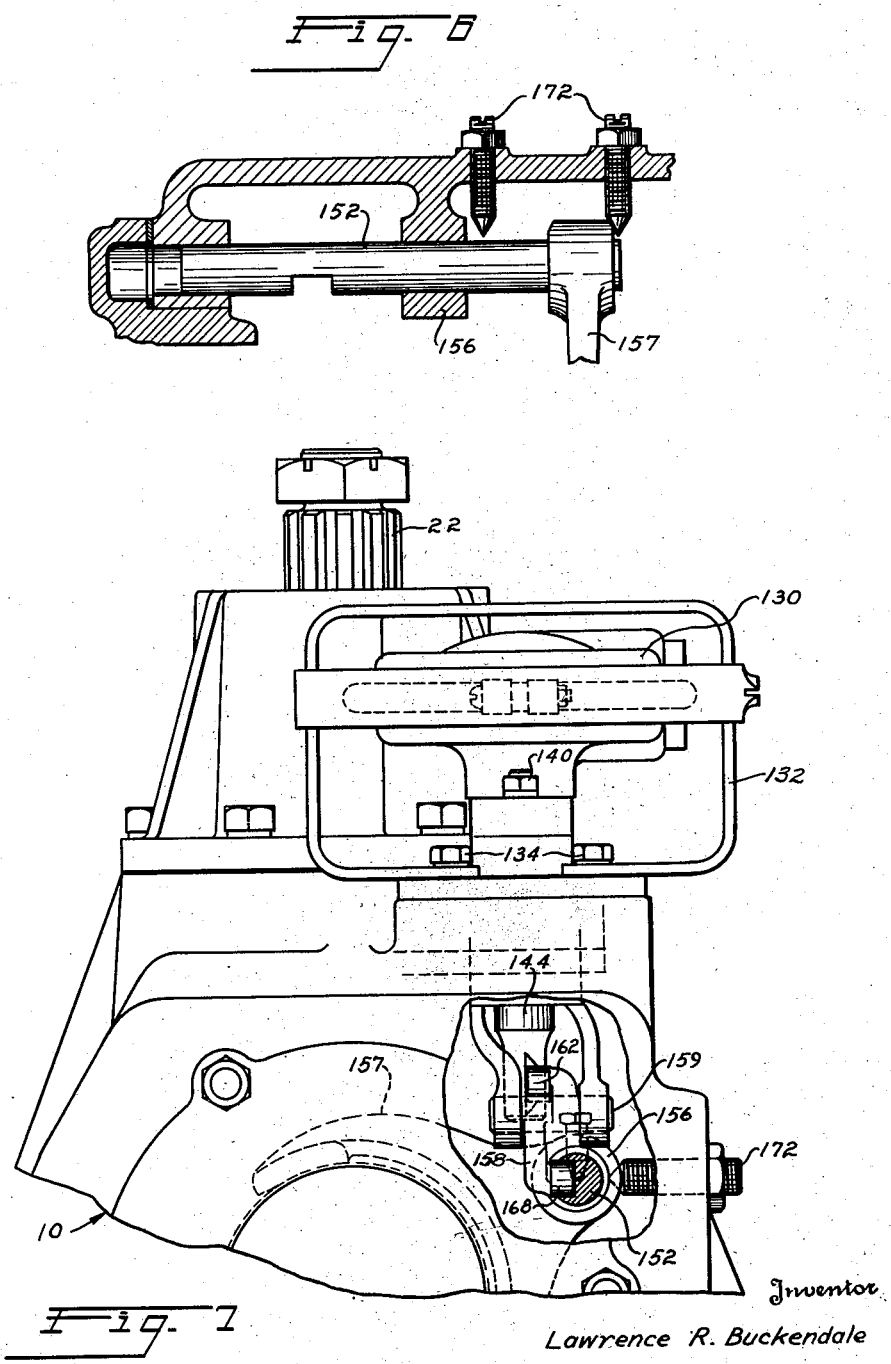
Inventor
Lawrence R. Buckendale
By Strauch + Hoffman
Attorneys Patented Aug. 5, 1952

2,605,749

UNITED STATES PATENT OFFICE 2,605,749

POWER-OPERATED MULTISTAGE SPEED SELECTOR MECHANISM

Lawrence R. Buckendale, Detroit, Mich., assignor to The Timken-Detroit Axle Company, Detroit, Mich., a corporation of Ohio Application May 16, 1945, Serial No. 594,115

3 Claims. (Cl. 121—38)

This invention relates to actuators for speed changing mechanism and has particular reference to multi-speed drive axles for motor vehicles in which means is provided for selectively driving the axles at high or low speed without de-clutching or disconnecting the train of drive mechanism from the source of power.

The general object and purpose of the invention is to structurally simplify and increase the operating efficiency of actuators of this type.

In the operation of motor vehicles, particularly of the heavy duty type, it is desirable to provide axle drive gear ratios, in addition to those afforded by the conventional variable speed transmission, which may be manually or automatically selectively controlled without declutching, and, while the selected transmission speed prevails, to increase or decrease the driving speed of the axles. Thus, instead of the usual three or four transmission speeds, six or eight axle driving speeds are available to obtain maximum speed with economical fuel consumption in the operation of the vehicle under varying traffic and road conditions.

By the provision of the additional gear ratios increased tractive effort at low speed is obtained with greater fuel economy at high speed by reducing the engine speed necessary to maintain a predetermined road speed, when the power required to maintain the road speed is not excessive. Since the two gear ratios at the axle double the range of driving speeds available by the conventional variable speed transmission, such two speed axles have in recent years been generally adopted for use in heavy duty vehicles. In such vehicles it is advisable to employ a positive type clutch for selectively connecting the two gears journalled on the driving shaft in the power transmission train. Preferably, I use a clutch having a special tooth construction in which a sliding clutch collar and two drive gears on opposite sides thereof have complementary clutch teeth provided with smooth end faces lying entirely within parallel surfaces of revolution generated by lines rotated about the axis of rotation of the gears. The clearance or backlash between the clutch teeth of the collar and gears is such, that when engaged end to end, said teeth will not inter-mesh in the relative rotation of the collar and gear until a condition of substantial synchronism is established.

For the purpose of easily and smoothly shifting the clutch collar out of mesh with one of the driving gears and into mesh with the other gear, by reason of high torque resistance, it is necessary to apply a force of relatively high magnitude to the clutch collar to disengage the teeth thereof from the teeth of the one driving gear and then apply a force to said collar of considerably less magnitude to engage its clutch teeth with the teeth of the other driving gear so that an effective inter-meshing relation of the clutch teeth will be obtained without destructive clash or injury to the clutch parts.

The present invention generically comprehends a power operated clutch actuating unit embodying an improved mechanical assembly of small dimensions and which may be operatively mounted on either the side or end of a gear housing as space conditions may require.

It is also an important object of the invention to provide simple and effective means for positively controlling and limiting the application of the high and low magnitude power forces to a clutch shifting member.

A more particular object of the invention resides in the provision of a clutch fork shifting rod or rail and an energy storing device associated therewith and means operatively connecting said rod and device with a power actuated member, whereby said device is pre-loaded in the initial portion of the power stroke of said member, a high magnitude power force is then applied to said rod independently of said device to disengage the clutch collar from one gear, and thereafter said energy storing device acts independently of the power operated member to apply a low magnitude power force to said rod or rail and engage the clutch collar with the other gear.

A further object of the invention is to provide a power operated clutch actuating unit having an energy storing device in the form of a single spring element with means for positively limiting the loading of said spring in each direction of movement of a power actuated member.

An additional object of the invention is to provide positive stop means limiting movement of the fork shifting rod or rail in each direction, and means acting upon the clutch collar independently of the power means to move the collar to final in-mesh position and center the same relative to the fork to avoid excessive wear and whereby the energy storing device is relieved of the working load.

With the above and other subordinate objects in view, the invention comprises the improved power actuator and the construction and relative arrangement of its several parts, as will hereinafter be more fully described, illustrated in the accompanying drawings and subsequently incorporated in the subjoined claims.

In the drawings wherein I have illustrated several concrete practical examples of my present improvement, and in which similar reference characters designate corresponding parts throughout the several views:

Figure 5 is a plan view partly in section, similar to Figure 1, but illustrating a slightly modified form of the actuator unit mounted on the front end of the differential gear housing;

Figure 6 is a side elevation of the construction shown in Figure 5, certain of the parts being shown in section; and Figure 7 is a fragmentary sectional view illustrating the arrangement of the stop members in said modified construction for limiting the reciprocating movement of the fork shifting rod or rail.

Figures 1, 2:
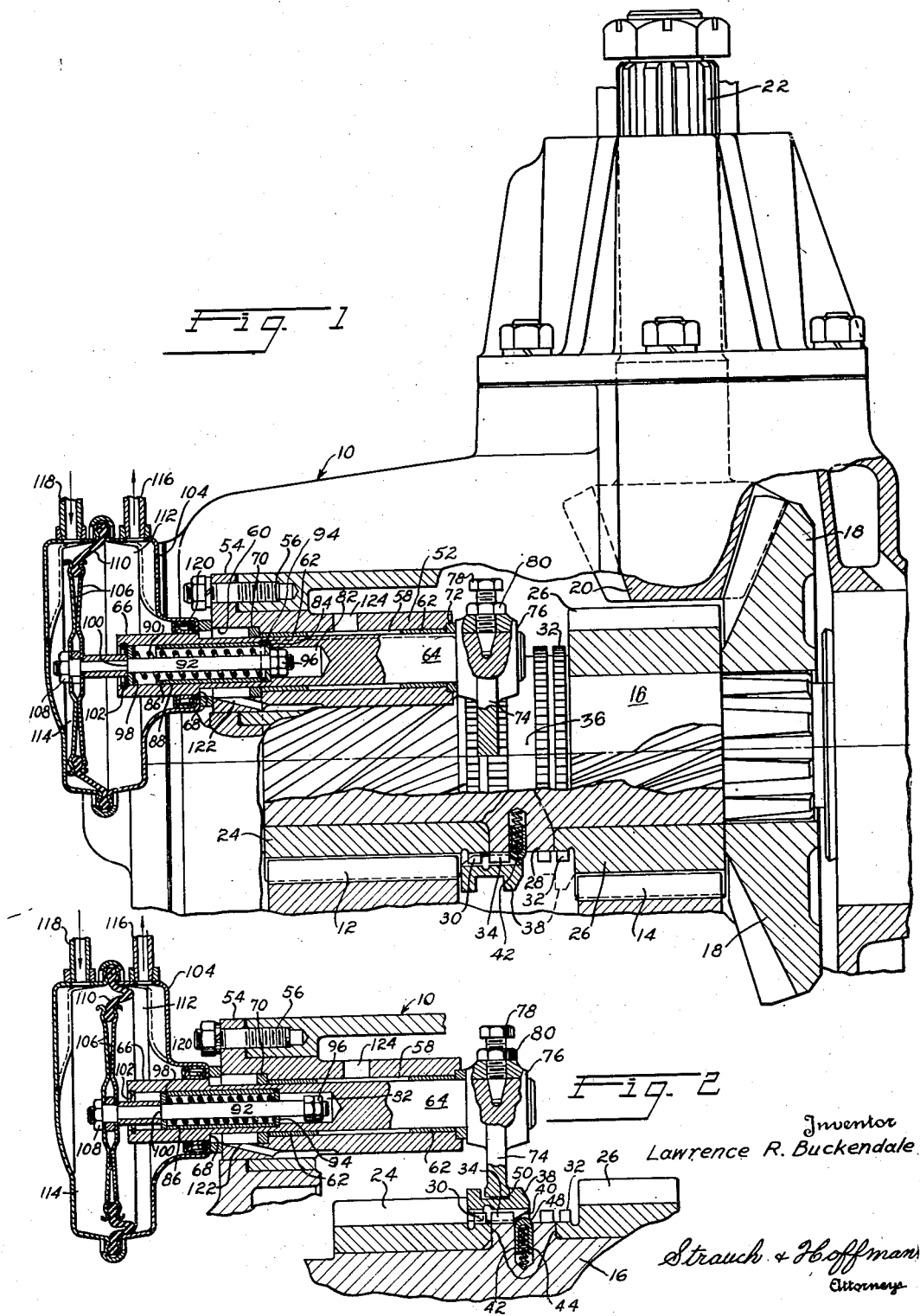
Figure 1 is a plan view partly in section showing one embodiment of my improved clutch actuator unit mounted on one side of a vehicle differential gear housing, the clutch collar being in mesh with one of the differential driving gears.
Figure 2 is a similar view illustrating the relative positions of the parts in the initial portion of the stroke of the power actuated member, after the energy storing device has been fully loaded.

Referring more particularly to Figures 1 to 4 of the drawings, the differential gear mechanism is contained within a suitable housing, partially indicated at 10 and operatively connected with the oppositely extending vehicle drive axles in the customary manner. For the purpose of this explanation, it will suffice to state that the differential mechanism includes the ring gears 12 and 14, respectively, of relatively different diameters through which the drive is selectively transmitted to the vehicle axles at low or high speed in the manner to be presently explained.

A drive shaft 16 is suitably journaled at its opposite ends in the housing 10. A bevel gear 18 is splined or otherwise fixed to the shaft 16 adjacent one of its ends and is in constant mesh with the bevel pinion 20 on the inner end of shaft 22, the outer end of which is connected in the usual manner by a suitable type of universal joint with the rear end of the propeller shaft driven by the variable speed transmission unit.

Upon the shaft 16 the low and high speed drive gears 24 and 26, respectively, are loosely journalled at opposite sides of the annular land 28 formed upon said shaft, and are in constant mesh with the differential ring gears 12 and 14, respectively. Each of these drive gears is formed at its inner end with the clutch teeth 30 and 32, respectively.

Upon the periphery of the land 28 teeth 34 are formed and divided into two sections complementary to the clutch teeth of the respective drive gears 24 and 26 by the circumferential groove 36.

With the teeth 34, the internal teeth of a clutch collar 38 slidingly coact whereby said collar rotates as a unit with the drive shaft 16 but may be shifted axially thereof to selectively engage its internal teeth with the clutch teeth of the gears 24 and 26.

Preferably, the opposing end faces of the clutch teeth on the collar 38 and the clutch teeth on the gears 24 and 26 have smooth end faces lying in parallel surfaces of revolution generated by lines rotated about the axis of the drive shaft. However, I may provide certain of the internal teeth on the clutch collar with inwardly inclined end faces as indicated at 40. A corresponding number of detents 42 are radially movable in bores 44 formed in the land 28 on the driving shaft and urged outwardly by the spring 46. Thus the outer convex ends 48 of the detents 42 will have a camming action against the inclined end faces 40 of the teeth on the clutch collar 38 for a purpose which will be later explained. The clutch collar 38 is externally formed with the annular groove 50 which loosely receives the arms of a shifting fork or yoke.

The actuating unit for the clutch collar 38 comprises the supporting member 52 for the shifter rod or rail disposed through an opening in one side wall of the housing 10 and having the flange 54 at its outer end rigidly fixed to said housing wall by suitable cap screws indicated at 56. This member 52 is formed with the longitudinal bore 58, counterbored at its outer end as at 60. In the opposite ends of the bore 58 suitable bushings 62 slidably support the fork shifting rod or rail 64 for reciprocating motion. The outer end of the rod 64 is of externally enlarged diameter as shown at 66 to be received in the counterbore 60 and provides the abutment shoulder 68 at its inner end for contact with the annular stop member 70 at the outer end of the bore 58 which is suitably fixed to the member 52. This stop 70 thus positively limits the reciprocating motion of the shift or rod 64 in one direction. A similar stop member 72 is fixed to the inner end of the supporting member 52 and, by contact therewith of the hub 76 of the shifter fork or yoke 74, limits the reciprocating movement of the rod 64 in the opposite direction. The fork hub is rigidly fixed to the inner end of the rod 64 by the screw 78 having a conical inner end portion seating in a conical recess in the rod 64 and securely fixed with relation to said hub by means of the lock nut 80.

The outer end portion of the shifter rail or rod 64 is formed with a longitudinally extending bore having a small diameter inner end section 82 providing the internal shoulder 84. In the relatively long large diameter section 88 of said bore a sleeve 86 is loosely disposed for free longitudinal movement relative to the rod 64 and encloses an energy storing device. In the present instance this device comprises a single coil spring 90 surrounding a rod or stem 92 of relatively small diameter. At its inner end this spring bears against a washer plate 94 loosely surrounding and slidable upon rod 92 and retained thereon by removable nuts 96, and the spring urges said washer plate into contact at its outer edge with the internal shoulder 84 of the rod 64, said edge of the washer plate being interposed between this shoulder and the inner end of the sleeve 86. At its outer end spring 90 bears against a similar washer plate 98 surrounding the rod 92 and yieldingly holds the same against the shoulder 100 formed on said rod. A split locking key 102 of annular form is seated in an internal groove in the outer end portion 66 of the rod 64 and retains the several parts of the energy storing device in assembled relation within the bore of the shifter rod or rail 64 and limits leftward movement of shaft 92.

While various types of power means might be provided for operating the above described clutch actuating unit, I preferably use a fluid pressure actuated means for this purpose. As herein shown, a reversibly operable fluid pressure actuated member is contained within a suitable casing 104, and in the present instance comprises a pair of sheet metal disks or plates 106 centrally fixed to the outer end of the rod 92 by means of a nut 108. Between the outer edges of these plates, the inner edge of a flexible diaphragm or member 110 is securely clamped, the outer edge of said diaphragm being suitably clamped or fixed to the circumferential wall of the casing 104. This pressure operated member thus divides the interior of the casing into two chambers 112 and 114, respectively. These chambers are connected by the conduits 116 and 118, respectively, with a manually or automatically operated selecting valve whereby said chambers may be selectively connected with a source of pressure, such as vacuum from the intake manifold of the vehicle engine, or with the atmosphere.

The inner wall of the casing 104 is formed with a diametrically reduced neck extension through which the outer end portion 66 of the shifter rod or rail 64 has sliding movement. This neck extension contains a suitable type of seal 120 to provide a fluid tight seal between the periphery of the shift rail or rod 64 and the chamber 112 of the casing 104.

The member 52 is provided at its inner side with a duct 122 communicating at one end with the interior of the differential gear housing 10 and at its other end with the counterbore 60 of the member 52. Additionally this member 52 may also be provided at its outer side with the opening 124. Through the duct 122 and opening 124 oil vapors may enter from the differential housing to lubricate the shifter rod or rail 64 and thus insure its free reciprocating motion.

From the above description, the operation of this embodiment of the invention will be clearly understood. As seen in Figure 1, the selector valve is in the slow or low speed position and vacuum exists in the chamber 114 while atmospheric pressure exists in the chamber 112. Thus the shift rod 64 is retained in its extreme left hand position with the hub 76 of the fork 74 in abutting contact with the stop member 72, and the teeth on the clutch collar 38 in mesh with the clutch teeth 30 of the low speed driving gear 24. The detent 42 retains the collar in a centered position relative to the fork 74 so that there is no lateral wearing pressure on the latter or working load on the spring 90 of the energy storing device.

When the selector valve is moved to the fast or high speed position the power chamber 112 is connected to the vacuum while the chamber 114 is connected with the atmosphere. However the clutch collar will remain locked to the low speed gear 24 as long as the driving torque is uninterrupted. The vacuum in chamber 112 moves rod 92 to the right relative to the shifter rod 64 and compresses the spring 90 to the limit fixed by the spacing of the collars 94 and 98 and the length of the sleeve 86. This pre-loaded condition of the energy storing device is illustrated in Figure 2 of the drawings.

Figure 3:
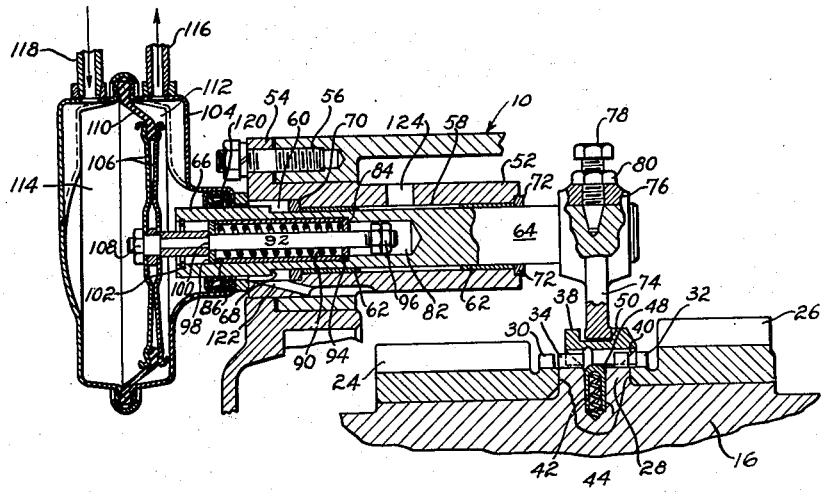
Figure 3 is a similar view illustrating the first or high power operating stage of the clutch fork shifting rail whereby, in the continued movement of the actuating member, the clutch collar is moved to a neutral position.
Figure 4:
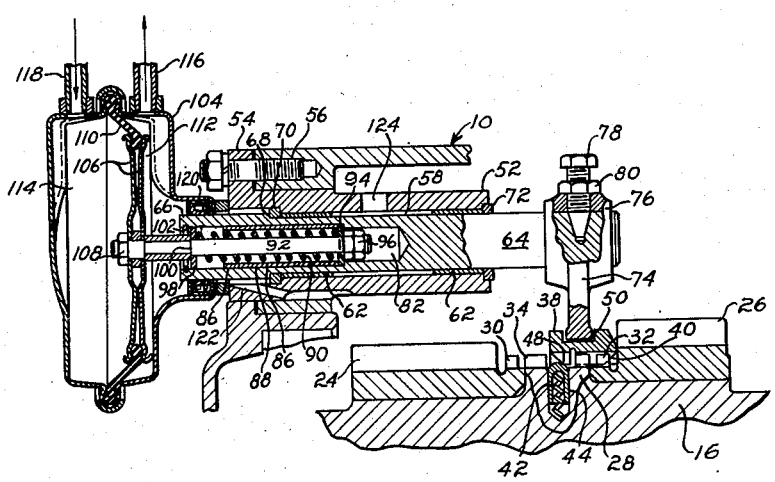
Figure 4 is a similar view illustrating the relative positions of the parts in the final or low power operating stage of the fork shifting rail, with the clutch collar in full mesh with the other of the differential driving gears.

By now momentarily relieving pressure on the accelerator, the torque load on the gears is released, thus permitting the full force of the vacuum in power chamber 112 to be exerted and move the shifter rod and fork with the collar 38 to the neutral position seen in Figure 3, to disengage the clutch collar from the clutch teeth of the low speed gear 24. It is to be noted that this high magnitude pressure force is applied to the shifter rod through the spacer washers 94 and 98 and the sleeve 86 and not through the spring 90.

The spring 90 now acts independently of the power means to urge the shifter rod and fork to the right relative to rod 92 and maintain a relatively light yielding pressure of the ends of the internal teeth of the clutch collar against the confronting ends of the clutch teeth on the drive gear 26. When the speeds of said gear and clutch collar are substantially synchronized, the spring 90 then acts to further shift the collar to the right and mesh the teeth thereof with the clutch teeth 32 of the high speed driving gear 26. This meshing movement is limited by contact of the shoulder 68 on the rod 64 with the stop member 70 and terminates slightly short of the full mesh position. The movement of the collar to the right is then continued independently of the fork 74 by the camming action of the detents 42 against the inclined end faces 40 of the coacting teeth on the clutch collar whereby said collar is properly centered with the side walls of the groove 50 therein out of contact with the fork so that excessive wear of the latter is avoided and the shifting spring 90 relieved of the working load.

In shifting from high to low axle speed, the above operations are reversed. By moving the selector valve to low speed position vacuum is again established in the chamber 114. Initially the rod 92 is moved to the left with respect to the shifter rod 64 and, in this movement, the sleeve 86 is also moved to the left relative to the shifter rod until the end of said sleeve abuts the stop collar 98 when the spring 90 is under full compression. By now releasing the torque load on the gears, as before, the full power of the vacuum in chamber 114 moves the energy storing device and shifter rod assembly as a unit to the left and disengages the clutch collar 38 from the clutch teeth of high speed driving gear 26. In this case, in the subsequent independent action of the energy storing device to continue the movement of the shifter rod or rail 64 to the left, it is advisable to accelerate the motor or engine to quickly synchronize the speeds of the clutch collar and the low speed drive gear 24 and obtain a quick and smooth meshing engagement between the teeth of the clutch collar and the clutch teeth 30 on said gear.

In certain installations, due to the presence of other accessories, it may not be possible to mount the actuating unit on the side of the differential gear housing. In such cases, I employ a slightly modified form of the invention as above described which may be readily mounted on the front end of the differential housing as seen in Figure 5 of the drawings to which reference should now be had.

In this embodiment of the invention the front end wall of the housing structure 10 at one side of the pinion drive shaft 22 is provided with an opening surrounded by the outwardly projecting annular boss 126. Upon this boss the base member 128 of the actuator unit is mounted. As herein shown, the casing 130 for the power operated member is supported in a suitable frame including the spaced strap members 132, the ends of which are seated upon apertured lugs on opposite sides of the base member 128 and secured therewith to the boss 126 by means of suitable attaching bolts indicated at 134.

A plate 136 is secured to the outer side of the base member 128 by means of the stud bolts 138 threaded in said base member and the clamping nuts 140 threaded on the outer ends of said bolts. This plate has a central opening 142. The end of the neck extension on the casing 130 bears against the face of the plate 136 around said opening. The rod 144 extends through the opening 142 and the cylindrical extension 146 of the base member 128 which projects inwardly through the boss 126, said rod being slidably mounted in the bearing bushings 148. The sealing device 150 mounted in the neck of the casing 130 has a part thereof extending into the opening 142 in sealing contact with the periphery of rod 144.

In this case the clutch fork shifter rod 152 is slidably mounted at one of its ends in an opening 154 in the side wall of the differential housing 10. In spaced relation therefrom the rod 152 is also slidably supported in a bearing extension 156 formed on the housing structure. The clutch collar shifting fork 157 is secured to the other end of the rod 152 in the manner above explained.

The energy storing device is housed within the rod 144, and said device and the actuating connection between the same and the power operated member in the casing 130 are the same as those theretofore described. It will thus be understood that in this form of the invention the rod 144 moves in a direction which is normal to the path of movement of the fork shifter rod 152. Any suitable means may be provided for transmitting reciprocating motion from the rod 144 to the shifter rod 152. As herein shown, for this purpose I preferably provide the bell crank lever 158 fulcrumed as at 159 upon an angularly offset arm 160 formed on the extension 146 of base member 128. One arm of this lever carries a roller 162 engaged in a recess 166 formed in one side of a longitudinal extension 164 on the inner end of the rod 144. The other arm of the bell crank lever also carries a roller 168 engaged in a recess 170 formed in one side of the fork shifter rod 152.

In one wall of the housing structure 10, stop screws 172 are threaded in predetermined spaced apart relation axially of the shifter rod 152 and have tapered inner ends for contact respectively with the chamfered or beveled side faces 174 on the hub of the shifter fork 158. It will thus be understood that these stop screws limit the reciprocating motion of the shifter rod 152 in each direction and the movement of the clutch collar by fork 157 to the in-mesh position under the action of the energy storing device.

The operation of this alternative embodiment of the invention is substantially the same as that first described. In the initial part of the stroke of the power operated member, the energy storing device within the rod 144 is pre-loaded while the bell crank lever 158 and shifter rod 152 remain stationary. Upon release of the driving torque, the full power of the said operating member is then applied to the rod 144 in the manner above explained to actuate lever 158 and shift the clutch collar out of mesh with one of the driving gears, whereupon said energy storing device becomes operative to shift said collar into mesh with the other of the driving gears. Thus the same two stage operation of the fork shifter rod 152 is obtained, the only difference being that, instead of the thrust forces of the operating connections with the power actuated member being directly applied to the fork shifter rod, they are transmitted thereto through the bell crank lever 158.

From the foregoing, the construction and manner of operation of the several described embodiments of the invention will be readily understood. It will be seen that, by embodying an energy storing device in the two stage operating connections between the clutch shifter fork and the power actuated member which comprises a single spring element functioning in each direction of movement of said member, I have materially simplified and increased the operating efficiency of prior actuator devices of this type. Also, the simple and compact assembly herein disclosed results in a more accurately controlled two stage shifting movement of the clutch collar and a final smooth and noiseless inter-meshed engagement of the clutch teeth thereon with the clutch teeth of the driving gear. The simple and rugged structural form of the several co-operating elements has resulted in economical production with high operating efficiency.

While my present improvements are of general application to all classes of motor vehicles, the invention is particularly advantageous in the operation of heavy duty vehicles such as large capacity trucks where reduction in running time, lower operating costs and increased earnings per ton-mile are factors of prime consideration. With the conventional single speed axle it is necessary to compromise between pulling ability on grades and top speed on level roads. Such a compromise is avoided by the use of the two-speed double reduction axle which enables the operator to obtain both pulling ability and speed, or in other words, the best gear ratios for both extremes of operating conditions. Such a two-speed axle with my improved actuating unit enables the operator to pre-select at will the low or high axle gear ratio, the clutch shift being carried out with maximum ease and facility, under normal operating conditions and without de-clutching and consequent loss of headway. Thus, both maximum pulling ability and speed with prevalent heavy loads can be obtained under varying road conditions, resulting in lower fuel consumption and maximum economy of operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In actuating means for a shiftable gear ratio selecting member, a tubular support having two axially spaced fixed radial stop surfaces that face opposite and away from each other, a fluid power motor comprising a casing, a power element movably mounted within said motor casing, a shifter member axially slidably mounted on said support having a hollow end portion, axially spaced fixed radial stop surfaces facing toward each other on said shifter member disposed axially outwardly of said support stop surfaces and adapted to respectively engage said support stop surfaces to limit axial movement of said shifter member in both directions, a rod secured to said power element and projecting through said casing into the hollow end portion of said shifter member, and a single spring housed within said hollow end portion and surrounding said rod for yieldably interconnecting said shifter member and said rod, said spring being compressed during initial movement of said power element in either direction and subsequently expanding to accomplish a gear shifting movement of said shifter member.

2. In actuating mechanism for connecting a shiftable speed change element to a power driven element, a tubular support having an inner end surface and an axially spaced internal shoulder providing a first pair of fixed stops, a shift member reciprocably mounted in said tubular support and formed with an outwardly open hollow bore, a pair of axially spaced radial surfaces on said member defining a second pair of fixed stops coacting with said first pair of stops to limit opposite movements of said shift member, a fluid motor containing said power driven element, a rod fixed at its outer end to said power driven element and projecting within said open bore, spaced washers slidably supporting said rod within said bore, a compression spring surrounding said rod between said washers, axially spaced abutments within said bore against which said washers are seated by expansion of said spring, a sleeve surrounding said rod within said bore and between said washers, the length of said sleeve being shorter than the axial distance between said abutments, and spaced stops on said rod adapted to abut one or the other of said washers during shift operation.

3. In actuating means for a shiftable gear ratio selecting member, a tubular support having two axially spaced fixed radial stop surfaces that face opposite and away from each other, a motor having a casing rigid with said support and including a power driven element, a shifter member axially slidably mounted on said support having a hollow end portion, axially spaced fixed radial stop surfaces facing toward each other on said shifter member disposed axially outwardly of said support stop surfaces and adapted to respectively engage said support stop surfaces to limit axial movement of said shifter member in both directions, a rod operatively connected to said element and projecting into the hollow end portion of said shifter member, and a single spring housed within said hollow end portion and surrounding said rod for yieldably interconnecting said shifter member and said rod, said spring being compressed during initial movement of said power element in either direction and subsequently expanding to accomplish a gear shifting movement of said shifter member.

LAWRENCE R. BUCKENDALE.

REFERENCES CITED

The following references are of record in the file of this patent:

UNITED STATES PATENTS

| Number | Name | Date |
|---|---|---|
| 1,515,841 | Dapron | Nov. 18, 1924 |
| 1,851,816 | Dieter | Mar. 29, 1932 |
| 2,092,580 | Kelley | Sept. 7, 1937 |
| 2,101,021 | Daly | Dec. 7, 1937 |
| 2,169,495 | Jessen | Aug. 15, 1939 |
| 2,193,039 | Nardone | Mar. 12, 1940 |
| 2,243,321 | Smith | May 27, 1941 |
| 2,356,598 | Lang | Aug. 22, 1944 |
| 2,373,259 | Price | Apr. 10, 1945 |
| 2,386,217 | Kegresse | Oct. 9, 1945 |
| 2,402,343 | Price | June 18, 1946 |